No. 733,031. PATENTED JULY 7, 1903.
C. H. GRASSING.
CULTIVATOR.
APPLICATION FILED JAN. 27, 1903.
NO MODEL.
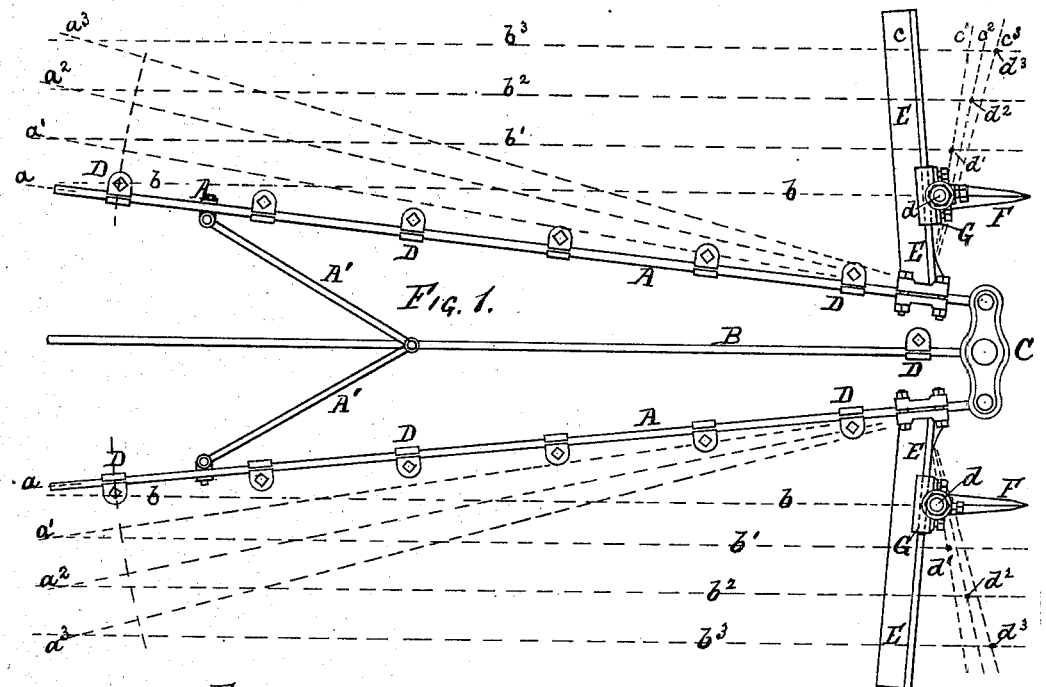
WITNESSES:—
INVENTOR:—
Carl H. Grassing.
by Wm H. Weightman
atty No. 733,031.

Patented July 7, 1903.

UNITED STATES PATENT OFFICE.

CARL HERMAN GRASSING, OF ROCHELLE PARK, NEW JERSEY.

CULTIVATOR.

SPECIFICATION forming part of Letters Patent No. 733,031, dated July 7, 1903.

Application filed January 27, 1903. Serial No. 140,744. (No model.)

*To all whom it may concern:*

Be it known that I, CARL HERMAN GRASSING, a citizen of the United States, residing at Rochelle Park, Bergen county, and State of New Jersey, have invented certain new and useful Improvements in Cultivators, of which the following is a specification, reference being had to the accompanying drawings.

My invention relates to and has for its object the improvement of that class of farming tools or implements known as "harrows" or "cultivators" so that any and all roots or runners between the rows of plants in a field or garden are cut loose from their roots before the teeth, shares, or colters act upon them or drag them along without injury to the plants within the row.

My invention is specially adapted to the cultivation of the strawberry-plant and cutting away of the runners or roots as they spread from row to row.

Certain of my improvements consist in providing the framing or arms of a harrow or cultivator with one or more side arms or knife-carriers located in an advanced position ahead of the teeth, shares, or colters.

Other improvements consist in providing said side arms with an adjustable clamp for carrying the root-cutting knife, whereby the root cut may be made approximately and desirably close to the plant-rows as well as outside of the line of travel of the teeth, shares, or colters.

Other improvements consist in the special construction, arrangement, and combination of the several parts, portions, or details of the apparatus, as hereinafter shown, described, or claimed.

In the accompanying drawings, Figure 1 represents a plan view of the operative arms, teeth, and cutting attachments of a frame expanding harrow or cultivator embodying my improvements. Figs. 2, 3, 4, and 5 represent detail views of the side arm or knife-carrier and an adjustable slide-clamp for holding the root cutter or knife in position.

Similar letters of reference designate like parts or portions in all the figures.

A designates the several adjustable arms of an expanding harrow or cultivator, the upper works being omitted.

B designates a central or fixed arm.

C designates a clamp or head to which arms A and B are attached and upon which arms A swing for adjustment when a greater or less width of clearing or cultivation is desired.

D designates the positions of the teeth, shares, or colters as attached to the cultivator-arms A and B.

E designates a special side arm or knife-carrier securely attached to the expander-arms A of the harrow or cultivator. They may, however, if desired, be attached to the central or fixed arm B or to the head-piece C. They are preferably located ahead of the several teeth, shares, or colters.

F designates a root cutter or knife, adjustably connected with the said side arm by means of an adjustable or sliding clamp G. It is preferably made of sickle shape to secure the greatest cutting contact; but it can be made with a straight blade, or, like the simitar, with convex return knife edge. As shown in the detail Figs. 3 and 4, it is provided with a collar $f$, a threaded stem $f'$, and jam-nut $f^2$ as a means for securing it to the clamp G. By loosening the nut $f^2$ it may be pointed in any desired or necessary direction, when the nut is again jammed. The lower portion or point of the root-cutter is preferably extended into the earth or ground below, so as to secure the roots or runners. As represented, the adjustable clamp G is grooved to slide along the side arm E and is secured in the desired position by means of the set-screws $g$. A special set-screw $f^3$ is made use of to keep the root-cutter F from revolving.

Referring specially to Fig. 1, the dotted lines $a$ $a'$ $a^2$ $a^3$ show four of the several positions in which the arms A may be set when the cultivator is spread out or contracted. $b$, $b'$, $b^2$, and $b^3$ designate the several cutting-lines of knives F. $c$, $c'$ $c^2$, and $c^3$ designate the positions of the arm E suitable to the several positions of arms A, and $d$, $d'$, $d^2$, and $d^3$ designate the several positions of the center of knife adjustment suitable to the positions of arms A.

In connection with the cleansing or cultivation of plants of the strawberry class from roots or runners deleterious to the well-being of such plants and their fruits it is necessary and advisable to clip or cut away all outlying roots or runners and to maintain the plant row so that the life of the plant may result in the production of fruit rather than roots or runners. My improvements are devised to provide for the prompt cutting, severing, or clipping of all objectionable roots or runners and to confine the plant to its own row. The cutters or knives are made adjustable to suit the desired distance between as well as the desired width of the several rows, according to the age, well-being, or efficiency of the plants. The line of cutting is preferably kept outside of the lines of drag and action of the teeth, shares, or colters, so that, as in the case of the cultivation of strawberries, the main plants or their main roots shall not be strained, dragged, or withdrawn from their position. In the cultivation of plants other than those of the strawberry class or such that do not throw out roots or runners and where only weeds or foreign roots are to be removed the cutter need not necessarily be located beyond the line of action of the teeth, shares, or colters; but, if deemed advisable, additional cutters may be used to chop, sever, or part the objectionable roots into short lengths.

What I claim as new, and desire to secure by Letters Patent, is—

1. In combination with the swinging colter-arms of an expanding harrow or cultivator, a knife-carrying arm attached to and projecting from said swinging colter-arm, substantially as and for the purposes set forth.

2. In combination with the swinging colter-arms of an expanding harrow or cultivator, side arms attached to said swinging colter-arms, and a root-cutting knife adjustably attached to said side arms substantially as and for the purposes set forth.

3. In combination with the swinging colter-arms of an expanding harrow or cultivator, side arms attached to each of said swinging colter-arms, clamps adjustably connected with each of said side arms, and root-cutting knives revolubly attached to said clamps, substantially as and for the purposes set forth.

CARL HERMAN GRASSING.

Witnesses:
WM. H. WEIGHTMAN,
HENRY J. WEHLE.